April 10, 1962 J. STRAUSS 3,028,836
COATING TABLE APPARATUS
Original Filed Feb. 6, 1957 2 Sheets-Sheet 1

INVENTOR.
Joseph Strauss
BY Shoemaker & Mattare
ATTORNEYS

COATING TABLE APPARATUS

Original Filed Feb. 6, 1957

INVENTOR.
Joseph Strauss
BY Shoemaker & Mattare
ATTORNEYS

United States Patent Office 3,028,836

Patented Apr. 10, 1962

3,028,836

COATING TABLE APPARATUS

Joseph Strauss, Hopewell, N.J., assignor to Trenton Times Corporation, Trenton, N.J., a corporation of Delaware Original application Feb. 6, 1957, Ser. No. 638,509. Divided and this application Apr. 22, 1958, Ser. No. 730,208

8 Claims. (Cl. 118—500)

The present invention relates to a new and novel coating table apparatus, and more particularly to coating table apparatus especially adapted for applying a flowable coating on printing plates or the like.

The present application is a division of U.S. patent application Serial No. 638,509, filed February 6, 1957.

In a method of making printing plates as disclosed in my aforementioned copending application, a flowable cold-top enamel is applied in a uniform coating over one surface of a magnesium printing plate. In such a a method, it is important to obtain a proper and uniform distribution of the coating on the printing plate to obtain the desired results. Application of such a cold-top coating ordinarily requires a highly skilled technician. It is, accordingly, desirable to provide an apparatus for coating printing plates wherein the skill required of an operator is minimized. It is additionally important to provide apparatus wherein the support means for the printing plates may be quickly and easily mounted on or dismounted from the apparatus in order to expedite processing of various printing plates.

The present invention employs a structure wherein a printing plate may be secured to a suitable support assembly which is dismounted from the apparatus. The support assembly may then quickly be mounted on the apparatus, and yet provides a positive interconnection between the support assembly and the associated components of the apparatus. This is accomplished by providing a novel hub and slot interconnection between the support assembly and a shaft upon which the support assembly is supported. The apparatus may be easily operated in a simple manner so as to provide a proper and uniform distribution of the coating on the surface of a printing plate, and requires a minimum of skill to obtain the desired results.

An object of the present invention is to provide a new and novel coating table apparatus wherein proper and uniform distribution of coating material is obtained on a printing plate associated with the apparatus.

Another object of the present invention is the provision of a coating table apparatus wherein the skill required of an operator is minimized.

A further object of the present invention is to provide a coating table apparatus wherein the support means may be quickly and easily mounted on and dismounted from the apparatus, and yet provides a positive connection when in operative position.

Yet another object of the present invention is the provision of a coating table apparatus wherein continuous rinsing is provided in the basin portion thereof in order to efficiently dispose of excess coating material which may drop from the support assembly of the apparatus.

A still further object of the present invention is to provide a coating table apparatus which is quite simple and inexpensive in construction, yet efficient and reliable in operation.

Other objects and many attendant advantages of the present invention will become more apparent when considered in connection with the accompanying specification and drawings wherein.

Figure 1:
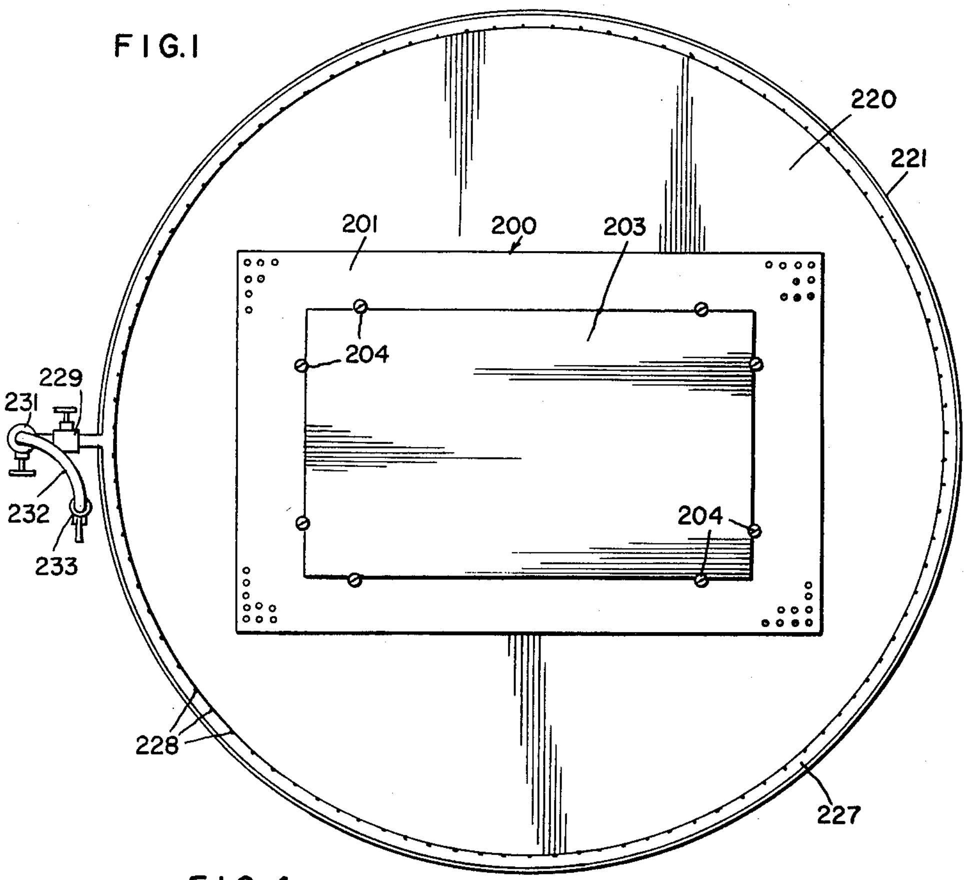
FIG. 1 is a top plan view of the coating table assembly.

Referring now to the drawings wherein like reference characters designate corresponding parts throughout the several views, reference character 200 generally designates a special supporting frame which is utilized to hold a magnesium plate or the like after the same has been properly cleaned and prepared. This frame is removable from the basin assembly shown most clearly in FIGS. 1 and 2, in a manner hereinafter described, and consists essentially of a main body portion in the form of a plate 201 which is provided with uniformly spaced perforations or holes 202 throughout and which are preferably closely spaced so as to render the plate as light weight as possible. In this respect also, the plate 201 is preferably made of some light weight material, such as aluminum or the like. The magnesium plate 203 is fastened to the support plate by a number of suitable screw fasteners 204 which are projected through the holes 202 and serve to hold the magnesium plate firmly in place on the support plate.

The support plate is provided on its undersurface with a hub 205 and radiating outwardly from this hub to the four corners of the support plate are the rigidifying ribs 206, 207, 208 and 209. As shown most clearly in FIG. 3, these ribs may be of conventional angle type, although, of course, any suitable shape may be chosen. The main plate portion 201, hub 205 and ribs 206—209 are all rigidly connected together and preferably are formed of light weight material.

The hub 205 is provided with a bore 210 of non-circular cross section which, in the particular example shown, is square and receives a square stub shaft 211 which forms part of a universal joint assembly indicated generally by the reference character 212. The hub is also provided with a notch 213, see FIGS. 3 and 4, the side walls 214 and 215 of which flare outwardly from the bore 210. The notch, as can be seen most clearly in FIG. 4, is not as deep as the bore 210 so that when the support plate assembly is engaged upon the universal joint stub shaft 211, the upper end of such shaft will be firmly seated within that square socket portion defined by the bore 210 above the notch 213 and the two parts, by virtue of the weight of support assemblies 200 and the magnesium plate 203 will, in effect, be locked upon the universal stub shaft.

The purpose of the notch 213 is to permit the support plate assembly to be easily engaged with the universal joint stub shaft since the divergent walls 214 and 215 of the notch will serve as a guide for the upper end of shaft 211 as the support plate assembly is moved horizontally into engagement therewith until the parts are aligned so that the support assembly will drop down as the blind socket portion in the hub aligns with and receives the upper end of the stub shaft 211.

Figure 4:
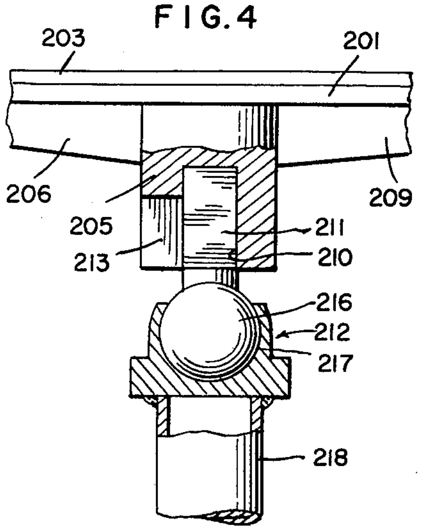
FIG. 4 is an enlarged sectional view taken along the plane of section line 4—4 in FIG. 2.
Figure 5:
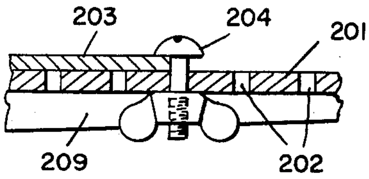
FIG. 5 is an enlarged sectional view showing one corner portion of the support plate assembly.

The universal joint itself may take any desired form such as that shown specifically in FIG. 4, wherein the shaft 211 has a ball 216 formed integrally at its lower end which is received in a socket 217 fixed to the upper end of a support post 218. By means of this construction, the base portion of the assembly, together with the support plate assembly, forms a universally tiltable table which may be advantageously used for applying cold-top enamel to a magnesium plate.

Figure 3:
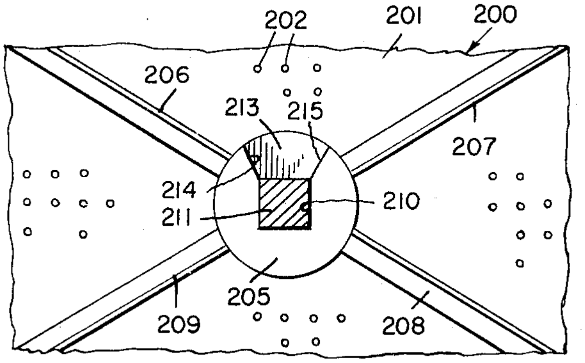
FIG. 3 is an enlarged view taken along the plane of section line 3—3 in FIG. 2 and showing details of the central portion of the support plate assembly.

The basin 219 includes a conical bottom wall 220 and a cylindrical side wall 221 supported by suitable legs 222 with the center of the bottom being provided with a drain opening defined by the depending nipple 223 with which drain pipe 224 is connected. A dome-like base 225 is secured over the drain opening and is provided with a suitable number of drain openings 226, as shown in FIG. 3 and the previously mentioned support post 218 is rigid with the base 225 and rises vertically therefrom in the center of the basin as is shown.

Secured on the inner side of and along the upper edge of side wall 221 is a pipe ring 227 having a series of openings 228 formed therein which are directed downwardly as shown and this ring is connected, through a valve 229, to a water supply pipe 230 so that when the valve 229 is opened, the openings 228 will direct convergent streams of water toward drain 224 forming a sheet-like flood of water along the bottom wall 220 to effect a continuous rinsing action. This continuous rinsing action will efficiently remove any excess cold-top enamel which should drop from the edges of the support assembly during application of the cold-top coating.

Water supply 230 also extends upwardly above the level of the universal joint 212, and through valve 231 and is connected to a flexible hose 232 having a nozzle 233 attached to the end thereof. Preferably, nozzle 233 is of the valved type having a control lever 234 controlling the same. It is evident that nozzle 233 may be manually actuated to direct a stream of water upon any desired portion of the support assembly or the remainder of the apparatus.

After a printing plate has been properly prepared and is in condition for coating with the cold-top enamel or the like, the printing plate is placed on the support assembly by means of fasteners 204 at some convenient location, and then the support assembly is mounted on the universal joint 212 of the apparatus.

The conventional cold-top enamel utilized in the process disclosed in my aforementioned copending application is preferably prepared by adding to the commercial blend thereof approximately 15 drops of ammonium hydroxide, 26° U.S.P. for each gallon of the cold-top enamel. This mixture is then filtered into a suitable container, and it is noted that the filtering operation is necessary to insure an even flow of the enamel.

Figure 2:
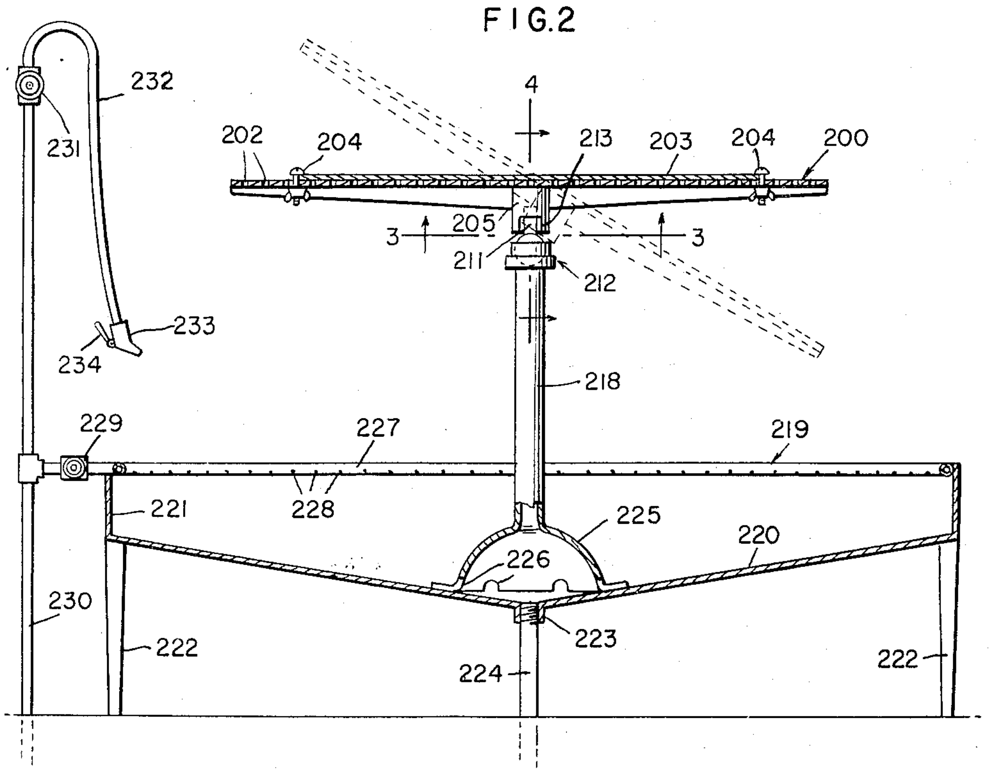
FIG. 2 is a vertical section taken through the assembly shown in FIG. 1 showing details of construction.

With the plate on the assembly shown in FIG. 2, the support is tilted and the cold-top enamel poured across the upper edge thereof and allowed to run and drain over the surface area of the plate while at the same time the support, being tiltable, is manipulated and tilted so as to achieve as uniform a distribution of the enamel over the surface of the plate as is possible. The plate may then be tilted the opposite way and more solution poured along the uppermost edge then presented and the tilting or rocking action repeated. This pouring of the cold-top enamel and rocking of the plate is repeated in all directions until the entire surface area of the plate has been wetted by the cold-top enamel. The support assembly with the plate attached is then removed from the structure shown in FIG. 2 and then placed in a suitable drying oven.

It is apparent from the foregoing that there is provided a new and novel coating table apparatus wherein a proper and uniform distribution or coating of cold-top enamel or the like may be obtained on printing plates. The skill required of an operator using the invention apparatus is minimized. The support means may be quickly and easily mounted on or dismounted from the apparatus, yet a positive interconnection is provided between the support assembly and its supporting shaft when in operative position. Any excess coating material which may drop from the support assembly is efficient and expeditiously carried away from the apparatus. The apparatus is additionally very simple and inexpensive in construction, yet is efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A coating table assembly comprising a basin-like base, means supported by said base and disposed therearound for continuously flooding said base with water from all sides thereof, a vertical post fixed to said base and rising from the central portion thereof, a socket fixed to the upper end of said post, a universal joint supported at the upper end of said post, said universal joint having a ball formed at the lower portion thereof and received in said socket, and a universally tiltable table-like support member carried by said universal joint and incorporating means for fixing a printing plate thereto.

2. The coating table as defined in and by claim 1 wherein said support member is provided with recess means slidably receiving the upper end of said universal joint, whereby the support member is removable from said universal joint.

3. The coating table as defined in and by claim 1 wherein said universal joint terminates at its upper end in a vertically projecting square shank, a hub fixed to the undersurface of said support and having a square recess therein removably receiving said shank.

4. The coating table as defined in and by claim 1 wherein said universal joint terminates at its upper end in a vertically projecting square shank, a hub fixed to the undersurface of said support and having a square recess therein removably receiving said shank, said hub having a horizontal notch therein opening upon the lower end of said hub and extending vertically therefrom to terminate short of the inner end of said hub recess, providing a horizontal entrance opening into said recess for said shank to pass while retaining a socket-like portion thereof above the notch to fixedly receive the upper end of said shank, the opposite sides of said notch being divergent from the recess to guide said shank into the recess.

5. An assembly for coating printing plates with light-sensitive enamel, comprising a basin having a bottom provided with a drain opening therein, an enclosing side wall fixed to said bottom, a water discharge conduit fixed to the inside of said side wall and extending around the inner periphery thereof, said conduit being provided with a series of openings for continuously flooding said bottom, a vertical post fixed to said bottom and rising from the central portion thereof, a universal joint movably supported at the upper end of said post, a tubular support carried by said universal joint so as to be universally tiltable on said post above said bottom, said support including means for affixing a printing plate thereto.

6. The coating table as defined in and by claim 5 wherein said support member is provided with recess means slidably receiving the upper end of said universal joint whereby the support member is removable from said univeral joint.

7. The coating table as defined in and by claim 5 wherein said universal joint terminates at its upper end in a vertically projecting square shank, a hub fixed to the undersurface of said support and having a square recess therein removably receiving said shank.

8. The coating table as defined in and by claim 5 wherein said universal joint terminates at its upper end in a vertically projecting square shank, a hub fixed to the undersurface of said support and having a square recess therein removably receiving said shank, said hub having a horizontal notch therein opening upon the lower end of said hub and extending vertically therefrom to terminate short of the inner end of said hub recess, providing a horizontal entrance opening into said recess for said shank to pass while retaining a socket-like portion thereof above the notch to fixedly receive the upper end of said shank, the opposite sides of said notch being divergent from the recess to guide said shank into the recess.

References Cited in the file of this patent

UNITED STATES PATENTS

| | | |
|---|---|---|
| 420,968 | Seaman | Feb. 11, 1890 |
| 538,453 | Marschuetz | Apr. 30, 1895 |

| | | |
|---|---|---|
| 538,534 | O'Neill | Apr. 30, 1895 |
| 707,353 | Post | Aug. 19, 1902 |
| 907,365 | Huebner | Dec. 22, 1908 |
| 996,226 | Ebeling | June 27, 1911 |
| 1,413,087 | White | Apr. 18, 1922 |
| 1,859,983 | Prillaman et al. | May 24, 1932 |
| 2,601,998 | Murray | July 1, 1952 |

FOREIGN PATENTS

| | | |
|---|---|---|
| 623,393 | Germany | Dec. 19, 1935 |